US007168754B2

(12) United States Patent  
Hinton

(10) Patent No.: US 7,168,754 B2
(45) Date of Patent: Jan. 30, 2007

(54) SLIDING PANEL SYSTEM

(76) Inventor: Golden S Hinton, 484 W. Cloverhurst Ave., Athens, GA (US) 30606

( * ) Notice: Subject to any disclaimer, the term of this patent is extended or adjusted under 35 U.S.C. 154(b) by 271 days.

(21) Appl. No.: 10/479,824

(22) PCT Filed: Mar. 12, 2003

(86) PCT No.: PCT/US03/07656

§ 371 (c)(1),
(2), (4) Date: Dec. 4, 2003

(87) PCT Pub. No.: WO2004/083582

PCT Pub. Date: Sep. 30, 2004

(65) Prior Publication Data

US 2004/0239145 A1 Dec. 2, 2004

(51) Int. Cl.
*E05D 15/06* (2006.01)
(52) U.S. Cl. .................. 296/147; 296/155; 49/426; 49/429
(58) Field of Classification Search ............. 296/155, 296/147; 49/426, 449; 280/DIG. 5
See application file for complete search history.

(56) References Cited

U.S. PATENT DOCUMENTS

| 1,587,658 A | 6/1926 | Laycock |
| 3,425,160 A | 2/1969 | Petterborg |
| 3,816,964 A | 6/1974 | Catalano |
| 4,398,373 A | 8/1983 | Mancuso |
| 4,541,202 A * | 9/1985 | Dockery ............... 49/362 |
| 5,005,315 A | 4/1991 | Jackson |
| 5,224,296 A | 7/1993 | Brignon |
| 5,529,369 A * | 6/1996 | Welborn ............ 296/146.1 |
| 5,564,774 A * | 10/1996 | Shinsen .............. 296/155 |
| 6,155,630 A * | 12/2000 | Fukumoto et al. ...... 296/155 |
| 6,276,745 B1 * | 8/2001 | Wilson .............. 296/155 |
| 6,497,072 B2 | 12/2002 | Fries |
| 6,902,220 B2 * | 6/2005 | Moskos et al. ........ 296/155 |
| 2002/0070582 A1 * | 6/2002 | Pyo .................. 296/146.2 |

* cited by examiner

*Primary Examiner*—Lori L. Coletta
(74) *Attorney, Agent, or Firm*—E J Asbury III, LLC

(57) ABSTRACT

A system and device of sliding panels contained in a frame that allows the panels to be stored in one part of the frame and moved to different parts when in use. Panels slide along horizontally and vertically within the frame so that various alternate placement of panels can close the frame, or create openings of different sizes, shapes and locations within the frame. The panels within this system can be used to enclose a vehicle or structure; to protect the interior of the structure and its occupants from inclement weather; miscellaneous intrusions such as insects, dirt and the like; as well as from firearm, chemical, and biological assault. The panels can be readily changed to accommodate to these needs by substituting a panel made of an appropriate material. If the panel system is used in modular form, even panel walls of buildings can be rapidly constructed. The device also can be used for a multi-panel display device.

25 Claims, 9 Drawing Sheets

SLIDING PANEL SYSTEM

STATEMENT OF RELATED APPLICATIONS

The present patent application is the United States Chapter II National Phase of Patent Cooperation Treaty (PCT) patent application no. PCT/US03/07656 having an international filing date of 12 Mar. 2003.

BACKGROUND OF THE INVENTION

1. Technical Field

The present invention relates generally to the field of sliding panel systems, and more specifically to the field of multi-panel systems capable of multiple configurations. The invention can be used to enclose a motor scooter or other vehicle to make the vehicle more weather and wind resistant; can be used to enclose a porch, patio or other structure with windows, screens or panels; and can be used for a multi-panel whiteboard, chalkboard, or other display device.

2. Prior Art

Panel systems are well known and form a wide variety of products. Panels are often used as windows or doors to accomplish closures of wall openings. Door and window assemblies often have two or more sliding panels supported in a frame. U.S. Pat. No. 3,425,160 to Petterborg discloses a plurality of panels suspended in edge-to-edge relationship from an upper track. A supporting carriage is mounted at one end of the track for lateral movement to bring various panels into alignment with the end of the track so that the panels can then be slid off the supporting carriage and along the overhead track, which extends across the top of the opening. The panels of the Petterborg '160 device only move along a single horizontal track and must always be kept in the same relative position to each other. Further, the storage compartment for storing panels is rather large.

U.S. Pat. No. 3,816,964 to Catalano discloses a window guard made up of a plurality of separate panels mounted for sliding horizontally between upper and lower tracks. At one end of the track is a storage unit for receiving the panels to be stacked. The panels of the Catalano '964 device only move along a single horizontal track and must always be kept in the same relative position to each other.

U.S. Pat. No. 5,005,315 to Jackson, Jr. discloses a multi-panel sliding closure unit having a plurality of sliding panels used to close a large opening in a building wall. Adjacent panels stand in edge-to-edge relationship; however, between adjacent panels is a vertical jamb post holding them securely on their vertical edges. Upper and lower tracks hold the horizontal edges of the panels so that the panels can slide along the tracks. The panels of the Jackson '315 device also only move along a single horizontal track and must always be kept in the same relative position to each other. Further, the storage compartment for storing panels also is rather large.

U.S. Pat. No. 5,224,296 to Brignon discloses a doorframe with at least one mobile panel. The mobile panel moves between a closed position where the mobile panel is in place in the doorframe and an open position where the mobile panel is moved aside with respect to the closed position. There are also provided a lower guide rail, at least one sliding unit positioned at the bottom of the mobile panel, and a mechanism for guiding and holding the mobile panel. The panels of the Brignon '296 device also only move along a single horizontal track and must always be kept in the same relative position to each other.

While the prior proceeds to disclose an array of panel systems, what is needed but not found in the prior art is a panel system that can be moved, opened or closed along a vertical, as well as a horizontal axis. Additionally, a multi-panel system allowing the displacement of the panels in multiple directions would have the ability to create openings of different sizes, shapes and locations. It is to these needs and others that the present invention is directed.

BRIEF SUMMARY OF THE INVENTION

The present invention is a sliding panel system comprising a plurality of panels that can slide along and within a frame in at least two directions, that is, along at least two axes. Among its many uses, the invention can be to help enclose a motor scooter or other vehicle so as to make the vehicle more weather and wind resistant; can be used to enclose a porch, patio or other structure with windows, screens or panels; and can be used as a multi-panel whiteboard, chalkboard or other display device. Generally, the invention can be used where any multi-panel system is needed.

The invention comprises a frame containing a plurality of sliding panels. The frame and panels combination generally constitutes a single unit that can be installed or retrofitted in an appropriate location or on a suitable structure. The panels slide along horizontal and vertical axes within the frame so that placement of panels can close the frame entirely, or create openings of different sizes, shapes and locations within the frame.

The sliding panel system of the present invention in one embodiment comprises a rectangular frame, a vertical crossbar, a horizontal crossbar, a moveable crossbar, and a plurality of panels. The frame in this embodiment is a relatively lightweight and strong quadrilateral with opposite sides parallel and equal in length. The vertical crossbar extends from the top center of the frame to the bottom center of the frame. The horizontal crossbar extends from the center of a first side of the frame to the center of the vertical crossbar. The moveable crossbar is attached to the center of the vertical crossbar or the center of a second side of the frame by a pivoting device or hinge so that it can be folded downwards or upwards vertically proximal to the vertical crossbar or the second side of the frame or pivoted to be horizontal preferably spanning the distance between the vertical crossbar and the second side of the frame. The panels can be stored in one corner of the frame and moved to different parts within the frame when in use.

Additional embodiments of the present invention include the use of two or more horizontal crossbars and/or vertical crossbars, along with additional panels, to create larger and/or more variable configurations. Also, the moveable crossbar can be constructed of two or more sections such that its length can be variable, such as by telescoping, fording or the like, such that the length of the moveable crossbar can be extended so that it can make contact with the frame when in the horizontal position.

With the panels in a stored position, at least a portion of the internal area of the frame is open. For example, when the panels in a four-panel configuration are in the stored position in a corner of the frame, three-quarters of the area of the frame is open. When the invention is used to enclose a vehicle, this opening allows a passenger or driver to enter and exit the vehicle. When the invention is used to enclose a structure, this allows one to enter and exit the structure and to allow continuous air circulation into and out of the structure. When the invention is used as a display device, this allows storage of the panels or of additional panels or other items behind the open area of the frame.

To close the panel system, the moveable crossbar is pivoted upwards or downwards, as appropriate, to be horizontal and extend between the vertical crossbar and the second side of the frame. A single panel, previously stored in a corner of the frame, can be slid from the stored position and underneath the moveable crossbar. This closes the bottom half of the frame while leaving the top half open. Another single panel can be slid upwards from the stored position and locked into place. This closes three-quarters of the frame while leaving one top quadrant open. This same panel can be slid across and over the moveable crossbar. In this position, one top quadrant of the frame is left open and the remaining three quadrants are closed. Another single panel from the stored position can be slid upwards and locked into place, thus closing the entire frame. The remaining panel in the stored position remains there, and can be permanently mounted so that it is not slidable, or it can be made slidable so that more configurations can be created.

Panels can be slid manually or be displaced by means of an electric motor. The panels can sit in direct contact with the frame and its adjacent crossbar or they can be placed on a guidance device, such as wheels, rollers or pads, so that they slide along the inner walls of the frame and the crossbars. A guidance device can be placed on one, two, three, or all four sides of each panel. Conversely, a guidance device can be placed along the inner walls of the frame and/or along the sides of the crossbars.

Locking devices, such as latches, hooks, pins, tabs, and the like, can be attached to the panels to hold them into place if need be. Locking devices can also be placed on the inner walls of the frame and/or on the sides of the crossbars for this same purpose. Otherwise, the panels can be held in place by friction or the surrounding structures.

Variations of closed and open positions can be formed depending on where the numerous panels are contained within the frame. Various configurations can also be made by using different materials as panels. Transparent, translucent or permeable wire screen or glass panels can be used in place of solid and opaque panels. For use on a vehicle, it is preferable that at least one of the top panels be a window. Additionally, in several other illustrative embodiments, the panels can be insulative or non-insulative, shatterproof or break and crack resistant, or bulletproof.

The present invention allows multiple panels to slide along both the horizontal and vertical axes of a frame. Such a multi-directional displacement can create openings of different sizes, shapes and locations within the frame. In addition to its advantages over the prior art, the present invention also retains certain important features. The panels can take up little space but can be rigid enough when closed to withstand high winds and other weather elements. The panels are conveniently contained within the frame structure so there are no loose pieces to be lost or destroyed. Further, the panels do not have to swing out to open, saving space and making them easy to deal with. Because the panels do not swing out to open, they are not subject to the wind if used to enclose a porch or patio, and can be left open to drive a motor scooter or other vehicle.

The present invention can also be used as a display or writing surface, such as a chalkboard or whiteboard. The system of panels allows more text and information to be displayed using less wall space. Further, text or graphics can be hid from view or displayed by easily sliding panels in different directions. Writings do not have to be erased; they can be simply moved to another section of the frame and recalled for later reference.

Thus, as can be seen, a feature of the present invention is to provide an easy to use sliding panel system. Other features are a sliding panel system that allows the panels to be stored in one part of the frame and moved to different parts when in use and that allows panels to slide along horizontal and vertical axes within the frame so that placement of panels can close the frame, or create openings of different sizes, shapes and locations within the frame. Additional features are a system for enclosing a motor scooter or other vehicle, a porch, patio or other structure, and for providing a multi-panel display device.

Other features of the present invention, when used to help enclose a vehicle, allow air circulation though the vehicle and the protection of persons and property within the vehicle from the elements of weather and wind, while still allowing passengers and drivers to enter and exit the vehicle. Similarly, when used to help enclose a structure, the present invention allows air circulation through the structure and the protection of persons and property from the elements of weather, while still allowing persons to enter and exit the structure. Further, when used as a display device, the present invention allows storage of the panels or use of additional panels or other items behind the open area of the frame.

These features, and other features, objects, and advantages of the present invention, will become more apparent to those of ordinary skill in the art when the following detailed description of the preferred embodiments is read in conjunction with the appended figures, in which like reference numerals represent like components throughout the various figures.

Figure 8:
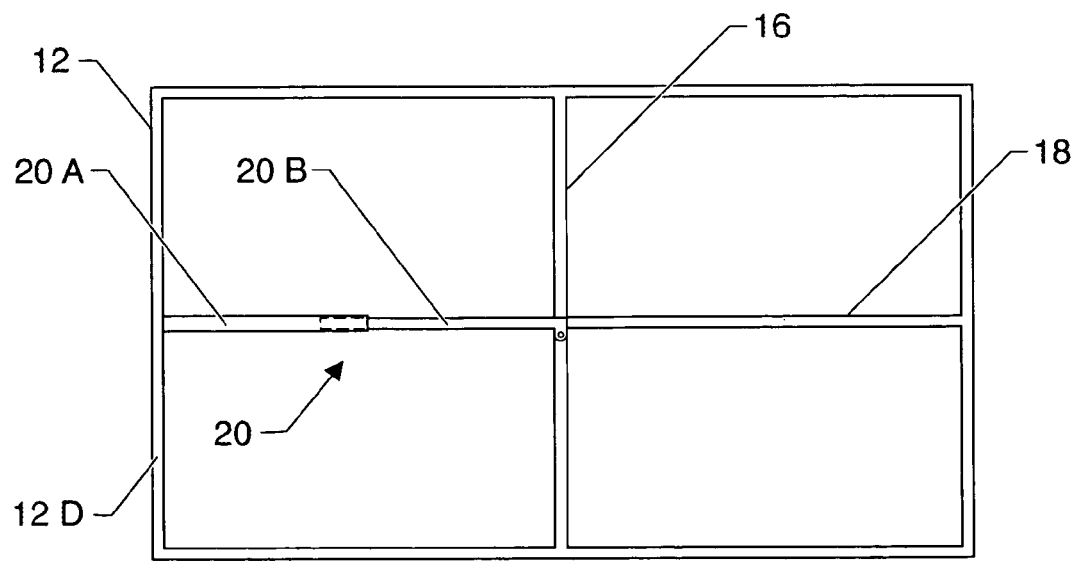
FIGS. 8A–8C are front views of several illustrative embodiments of extendable moveable crossbars, with FIG.
Figure 8:
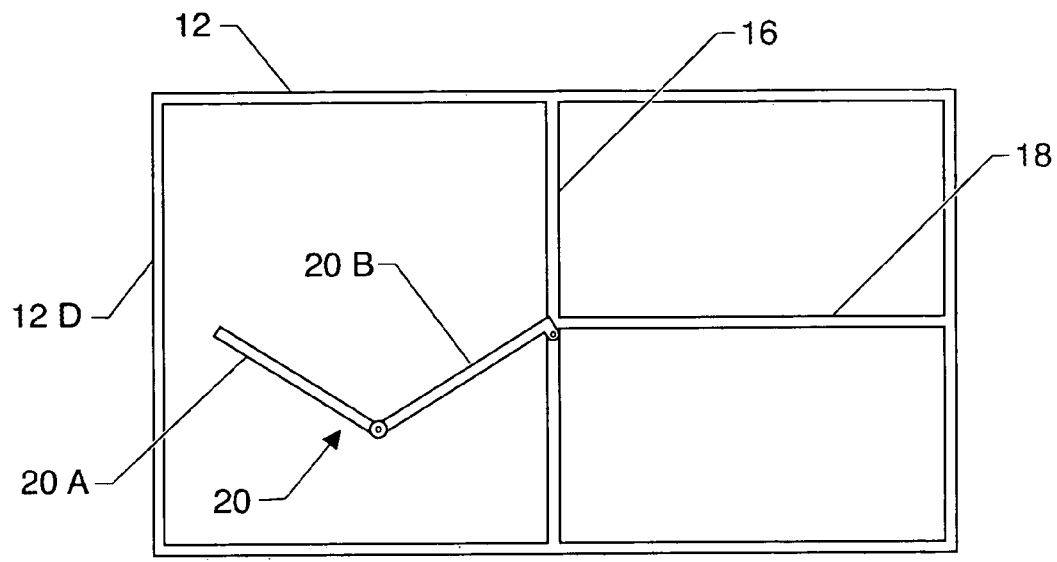
Figure 8:
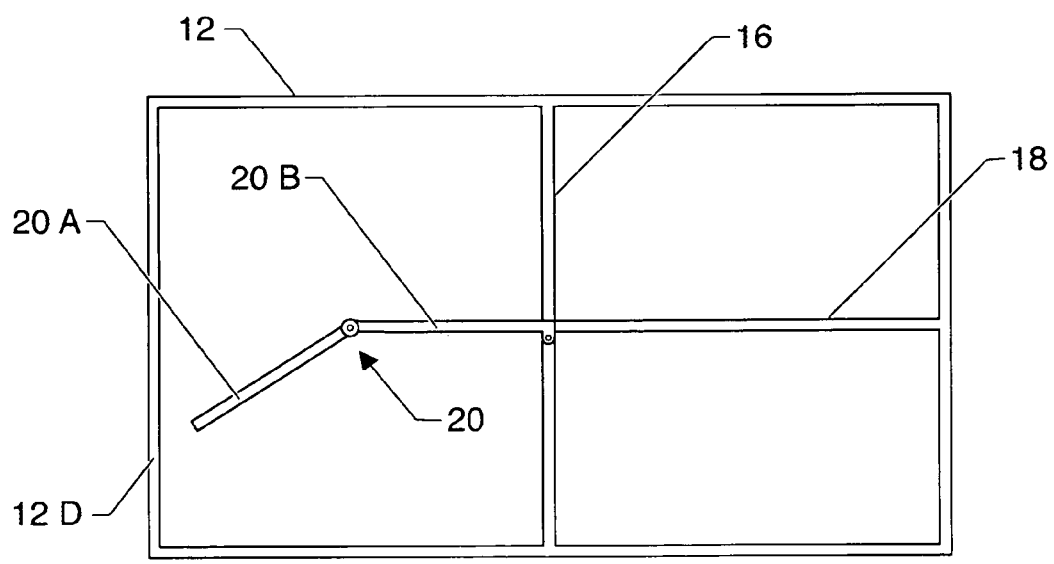

8A showing a telescoping configuration, FIG. 8B showing a first hinged configuration, and FIG. 8C showing a second hinged configuration.

Figure 9:
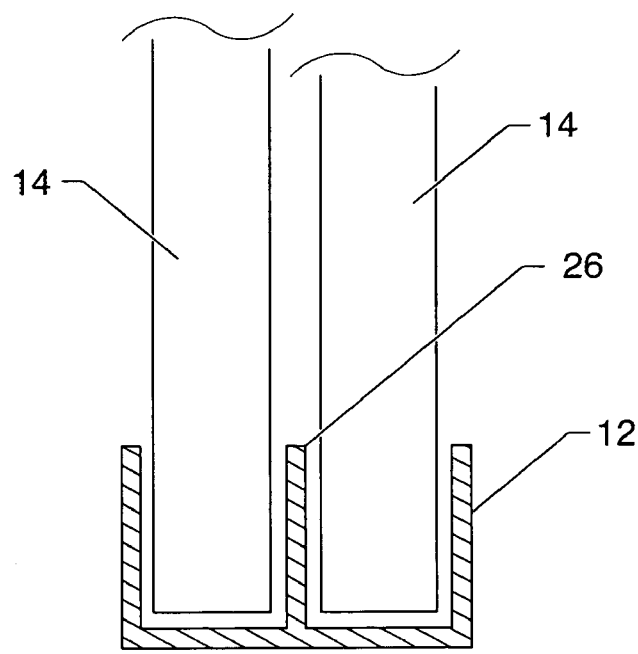

FIG. 9 is a cross-sectional view of one embodiment of the frame of the present invention with two panels resting in the side of the frame.

Figure 10:
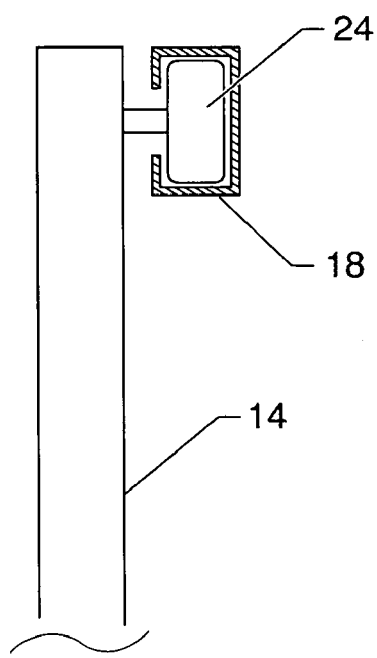

FIG. 10 is a cross-sectional view of another embodiment of the frame of the present invention using rollers attached to the panels that roll within the interior of the frame.

Figure 11:
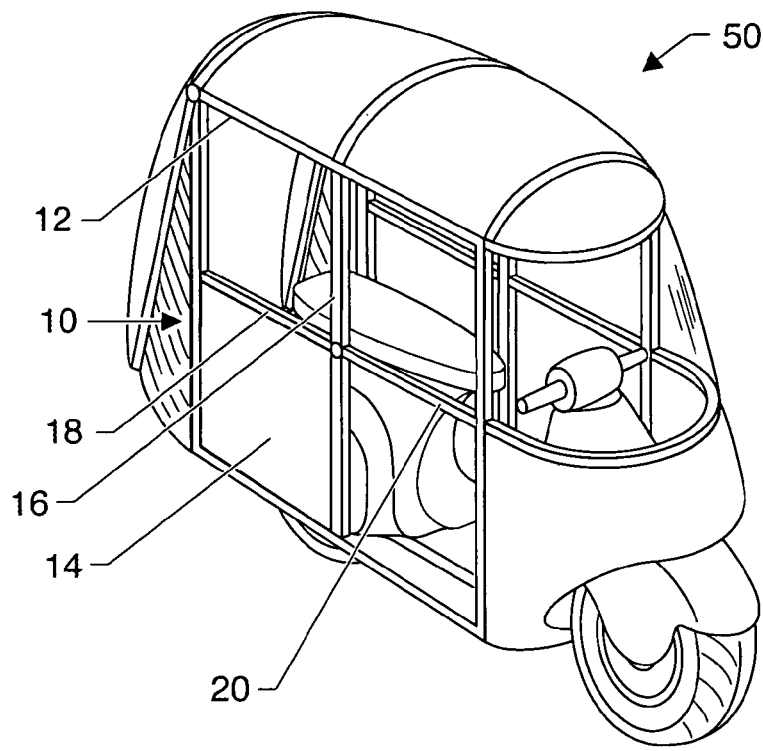

FIG. 11 is a perspective view of the present invention as it could be used to enclose a motor scooter.

Figure 12:
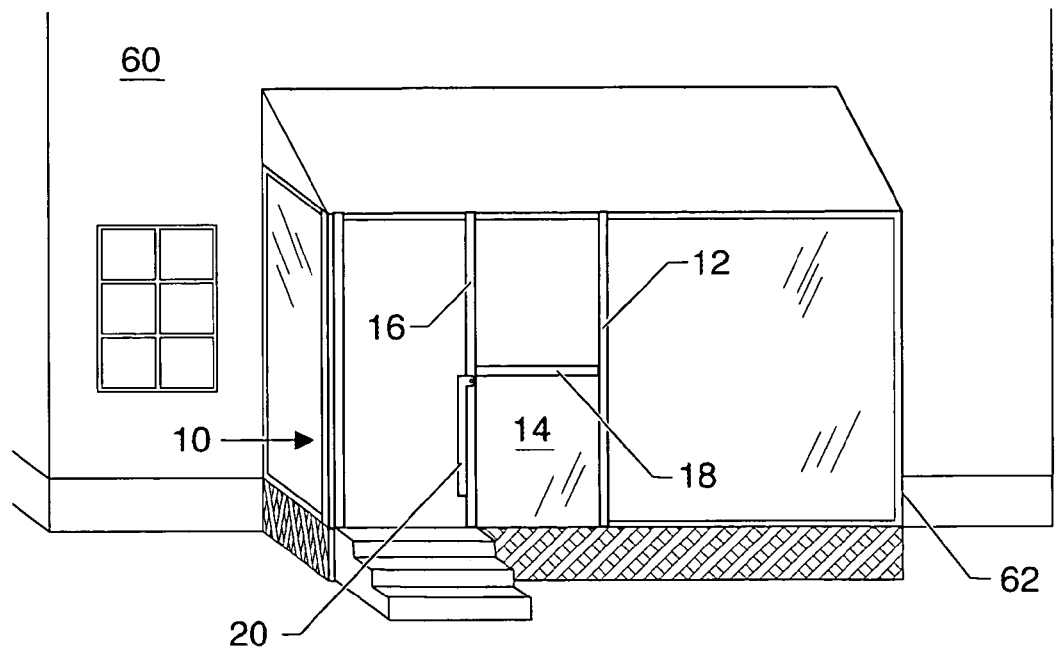

FIG. 12 is a perspective view of the present invention as it could be used to enclose a porch.

Figure 13:
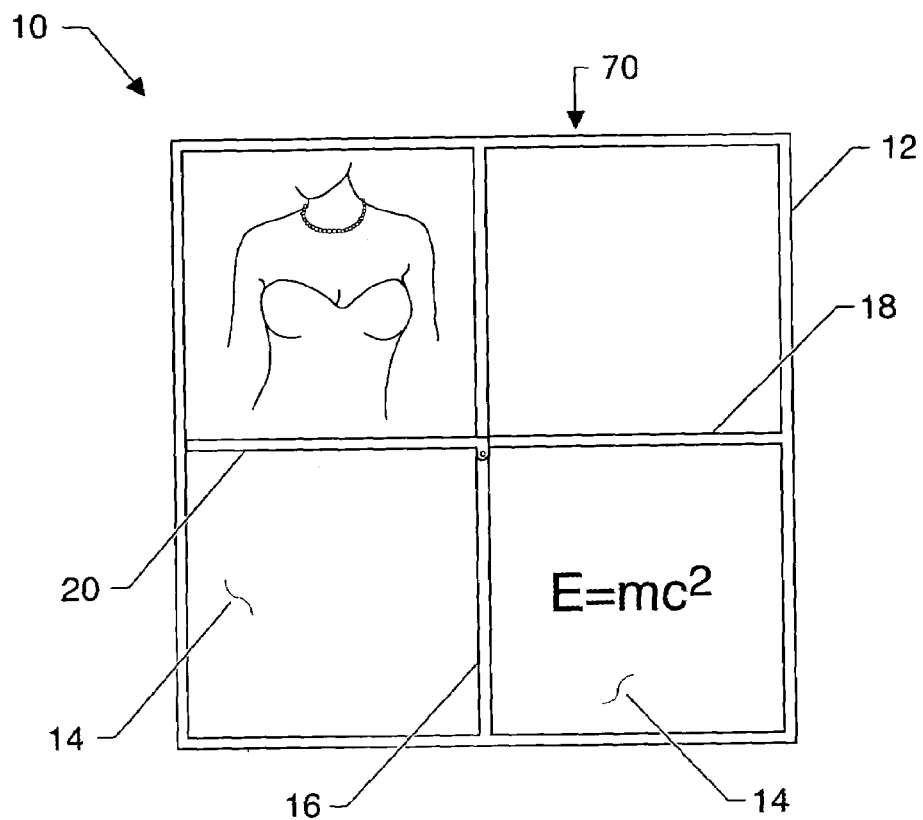

FIG. 13 is a perspective view of the present invention as it could be used as a display system.

Figure 14:
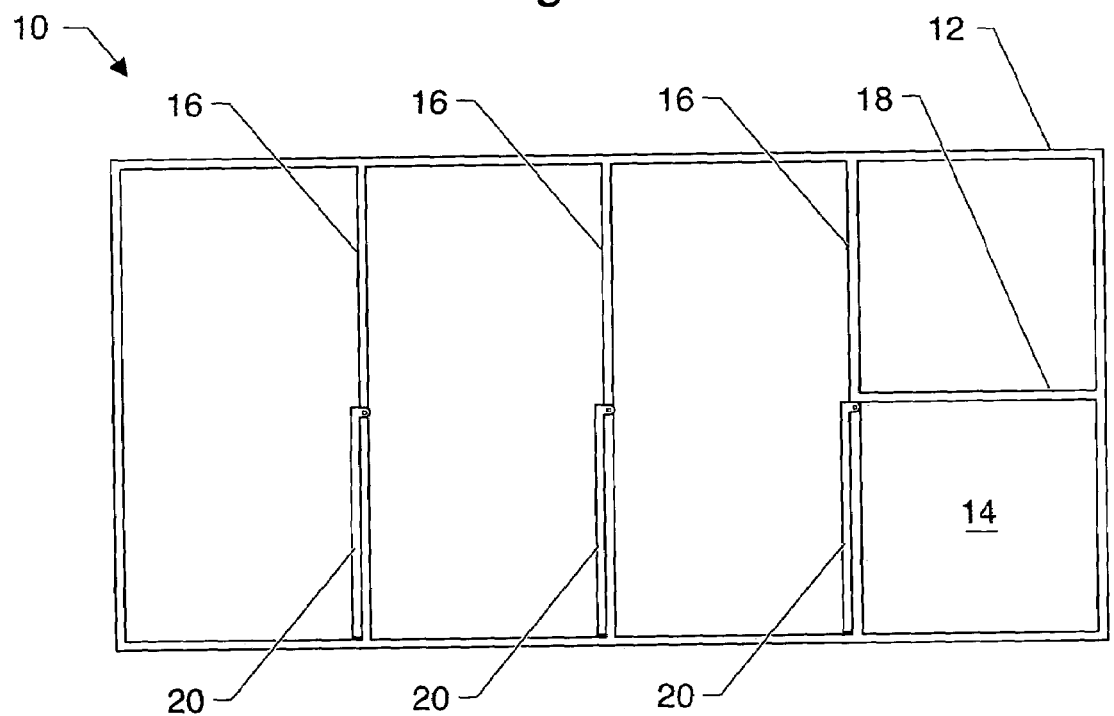

FIG. 14 is a front view of another embodiment of the sliding panel system of the present invention with the panels in a stored position.

Figure 15:
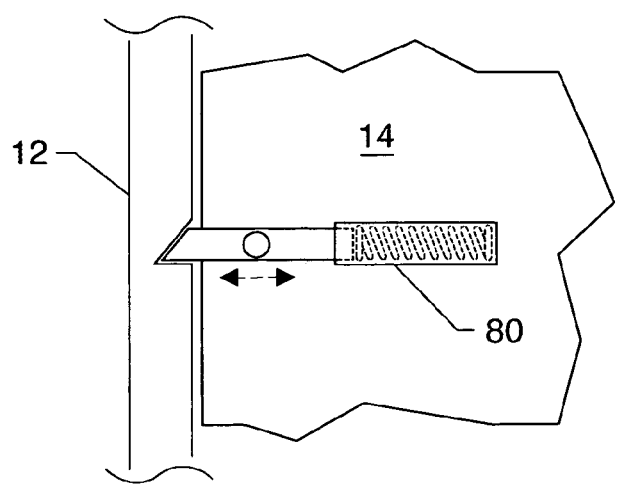
Figure 15:
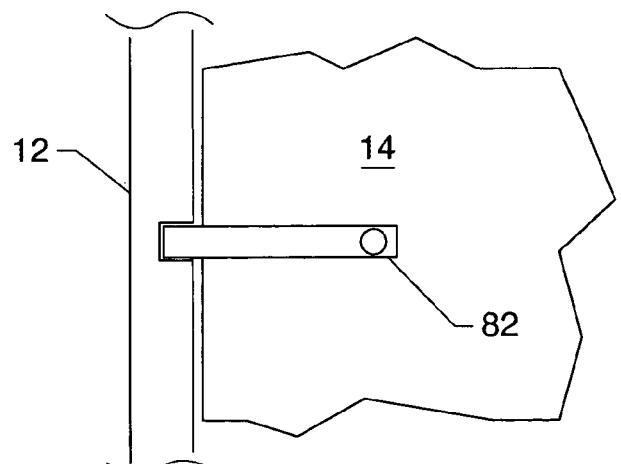
Figure 15:
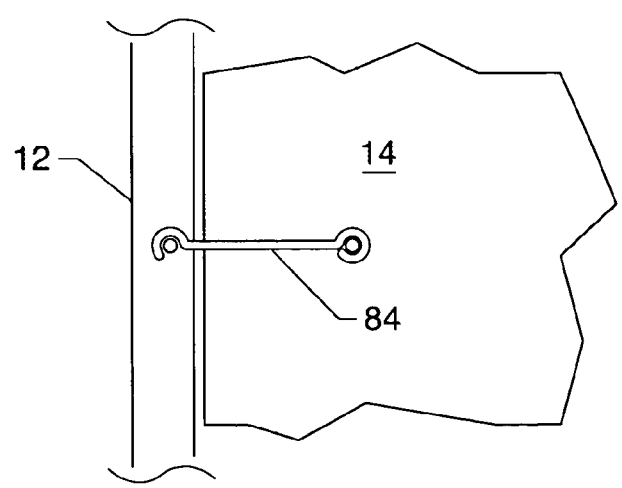

FIGS. 15A–15C are front views of several illustrative embodiments of locking mechanisms for the panels, with FIG. 15A showing a latch configuration, FIG. 15B showing a tab configuration, and FIG. 15C showing a hook configuration.

DETAILED DESCRIPTION OF THE PREFERRED EMBODIMENTS

The present invention is a sliding panel system comprising a plurality of panels that can slide along and within a frame in at least two directions, that is, along at least two axes. The invention can be used, for illustrative purposes, to enclose a motor scooter or other vehicle so as to make the vehicle more weather and wind resistant; to enclose a porch, patio or other structure with windows, screens or panels; and as a multi-panel whiteboard, chalkboard or other display device. Generally, the invention can be used where any multi-panel system is needed.

Figure 1:
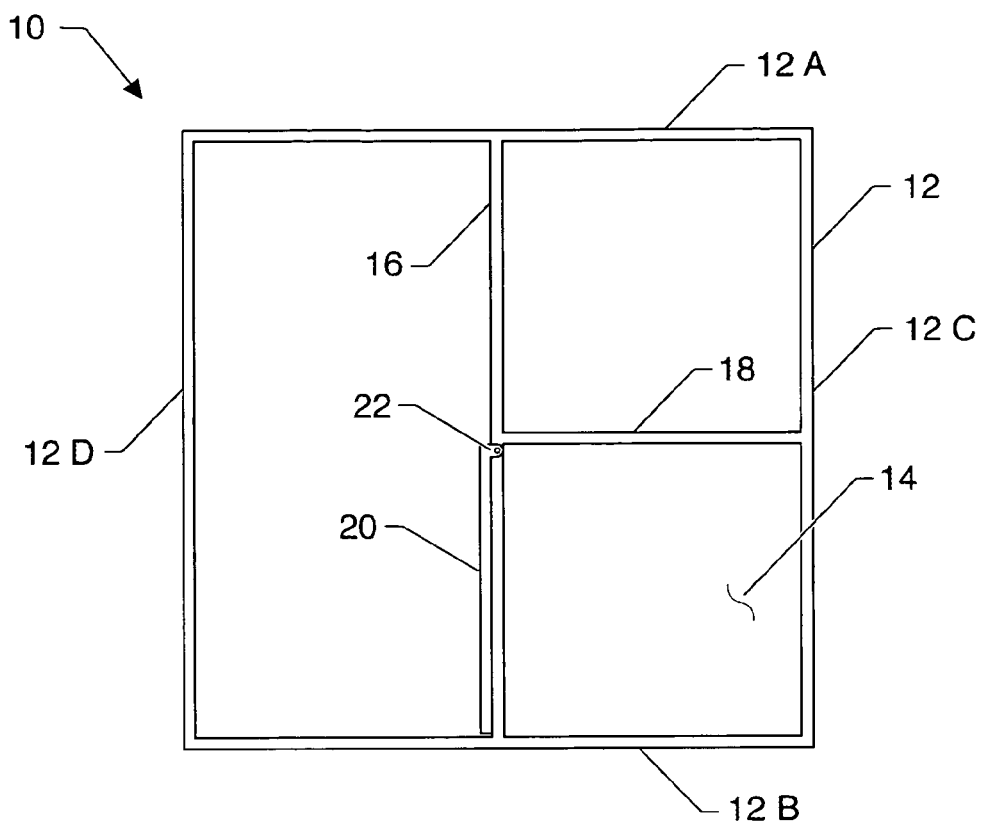
FIG. 1 is a front view of one embodiment of the sliding panel system of the present invention with the panels in a stored position.

Referring to FIGS. 1–7, the invention comprises a frame 12 containing a plurality of sliding panels 14. The frame 12 and panels 14 combination generally constitutes a single unit 10 that can be installed or retrofitted in an appropriate location or on a suitable structure. The panels 14 slide along horizontal and vertical axes within the frame 12 so that placement of panels 14 can close the frame 12 entirely, or create openings of different sizes, shapes and locations within the frame 12. As shown in FIG. 1, one embodiment of the sliding panel system unit 10 comprises frame 12, panels 14, vertical crossbar 16, horizontal crossbar 18, and moveable crossbar 20.

For illustrative purposes throughout FIGS. 1–7, the sliding panel system comprises a rectangular frame 12, a vertical crossbar 16, a horizontal crossbar 18, a moveable crossbar 20, and a plurality of panels 14. The frame 12 in this illustrative embodiment is a relatively lightweight and strong quadrilateral with opposite sides parallel and equal in length. The vertical crossbar 16 extends from the top side 12A center of the frame 12 to the bottom side 12B center of the frame 12. The horizontal crossbar 18 extends from the center of a first side 12C of the frame 12 to the center of the vertical crossbar 16. The moveable crossbar 20 is attached to the center of the vertical crossbar 16 or the center of a second side 12D of the frame 12 by a pivoting device 22 or hinge so that it can be folded downwards or upwards vertically proximal to the vertical crossbar 16 or the second side 12D of the frame 12 or pivoted to be horizontal preferably spanning the distance between the vertical crossbar 16 and the second side 12D of the frame 12. The panels 14 can be stored in one corner of the frame 12 and moved to different parts within the frame 12 when in use. Frame 12, vertical crossbar 16, horizontal crossbar 18, and moveable crossbar 20 can be made from any appropriate structural materials, currently known or developed in the future, such as wood; plastic and other polymers; aluminum, steel, titanium and other metals; fibreglasses, graphite and carbon composites, and other composites; or any relatively lightweight, relatively strong, stable material.

FIG. 1 illustrates that frame 12 can be structured so as to contain and retain the panels 14. FIG. 1 illustrates panels 14 in a stored position in the lower right quadrant, wherein the remaining three-quarters of the area in frame 12 is open, namely, the lower left, upper right and upper left quadrants. For use in a vehicle, this allows a passenger or driver to enter and exit the vehicle through the left half of the frame 12. For a structure, this allows one to enter and exit the structure through the left half. For a display device, this allows storage of the panels or use of additional panels or the wall behind the open areas of frame 12.

Panels 14 also can be quadrilaterals with opposite sides parallel and equal. The panel 14 length preferably is equal to or slightly less than approximately half the length of frame 12, and the panel 14 width preferably is equal to or slightly less than approximately half the width of frame 12 so that, at all times, each panel will sit securely yet slidably between frame 12 and the appropriate set of crossbars 16, 18, 20. The thickness, or depth, of each panel is dependent on the materials of manufacture and the purpose of the panel, as discussed in more detail below, but preferably is less than the total depth of frame 12. Panels 14 can be made from materials such as woods; plastic and other polymers; aluminum, steel, titanium and other metals; transparent, translucent, colored and opaque glasses; chalkboard, whiteboard and other writing surfaces; wire screens; insulative, shatter resistant, bullet proof or other specialty materials; or any other suitable material, or a combination of two or more of the above. For example, in one embodiment, two panels 14 can be made of aluminum, one panel 14 can be made of glass, and one panel 14 can be made of half glass and half aluminum.

Vertical crossbar 16 extends from the top side 12A of frame 12 to the bottom side 12B of frame 12. Vertical crossbar 16 preferably is centered generally between the first side 12C of frame 12 and the second side 12D of frame 12 so that one or more panels 14 can be placed on each side of vertical crossbar 16. The width of vertical crossbar 16 can be thicker or thinner than the width of the walls of frame 12. Vertical crossbar 16 can have has a flat, rectangular cross-section and function more of a brace. Alternatively, vertical crossbar 16 can have a shaped cross-section and be used, for example, as a guide for rollers attached to the panels 14, as discussed in more detail below.

Horizontal crossbar 18 extends from the first side 12C of frame 12 to vertical crossbar 16 so that its length generally is approximately one-half the horizontal length of frame 12. Horizontal crossbar 18 preferably is centered generally between the top side 12A of frame 12 and the bottom side 12B of frame 12 so that a panel 14 can be placed above and below horizontal crossbar 18. The width of horizontal crossbar 18 also can be thicker or thinner than the width of the walls of frame 12. Horizontal crossbar 18 also can have has a flat, rectangular cross-section and function more of a brace. Alternatively, horizontal crossbar 18 also can have a shaped cross-section and be used, for example, as a guide for rollers attached to the panels 14, as discussed in more detail below.

Vertical crossbar 16 and horizontal crossbar 18 are added to support the structure of frame 12 and to block the cracks between the panels 14 when the panels are in the closed position. If the vertical crossbar 16 and the horizontal crossbar 18 are used as braces only, the thickness of vertical crossbar 16 and horizontal crossbar 18 preferably does not extend into the inner portion of frame 12. Thus, such fixed crossbars 16, 18 are not contained within the sliding panel area of frame 12, rather they are attached to frame 12 so that panels 14 slide either in front of or behind the flat crossbars 16, 18. Alternatively, if the vertical crossbar 16 and the horizontal crossbar 18 are used a guides for guiding and holding the panels 14 in place, crossbars 16, 18 have a formed cross-section allowing a guiding portion of panels 14, such as roller or pads, to fit within the cross-section of crossbars 16, 18, as shown illustratively in FIG. 10.

Moveable crossbar 20 is attached to vertical crossbar 16 by a pivoting device 22 or hinge so that moveable crossbar 20 can be folded downwards or upwards vertically or pivoted to be horizontal. When moveable crossbar 20 is in its downward or upward vertical position, moveable crossbar 20 generally is parallel to and proximal or touching vertical crossbar 16. In this position, as shown illustratively in FIG. 1, there is provided an opening in half of the area of frame 12, specifically the left side of frame 12. For use in a vehicle, this allows a passenger or driver to enter and exit the vehicle. For use in a structure, this allows one to enter and exit the structure. For use as a display device, this allows storage of the panels or use of additional panels behind the open area of the frame 12.

Pivoting moveable crossbar 20 to be horizontal helps close the panel system. Moveable crossbar 20 is pivoted to the horizontal position, in which position the end of moveable crossbar 20 distal from the pivoting device 22 and vertical crossbar 16 is now proximal to the second side 12D of frame 11. Moveable crossbar 20 can be locked in place against second side 12D of frame 12 using any known or future developed locking means, such as latches, pins, clips, sliding bars, and the like. Once moveable crossbar 20 is in place against or proximal to second side 12D of frame 12, moveable crossbar 20 supports a panel 14 that has been slid over moveable crossbar 20, as shown in more detail in FIGS. 5 and 6. Further, moveable crossbar 20 can be structured to block cracks between the panel 14 and the moveable crossbar 20 when the panel system is in the closed and semi-closed positions.

Figure 2:
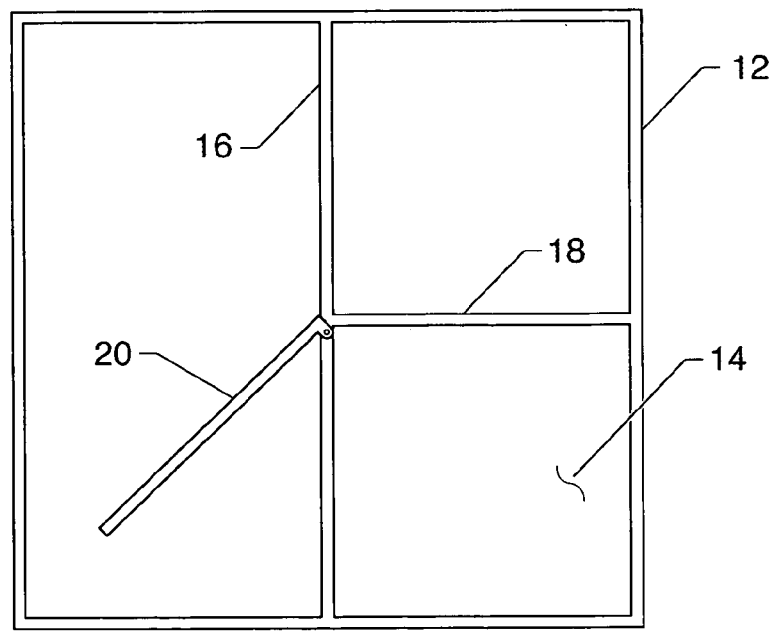
FIG. 2 is a front view of the embodiment of the sliding panel system of FIG. 1 with the panels in a stored position and the movable crossbar pivoted upwards to be horizontal.
Figure 3:
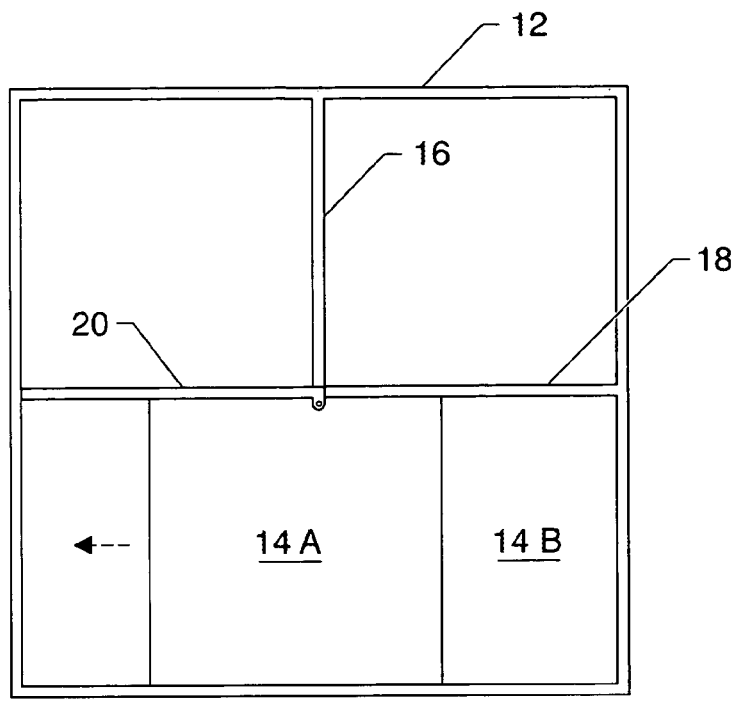
FIG. 3 is a front view of the embodiment of the sliding panel system of FIG. 1 with a first panel slid to the side and underneath the movable crossbar, exposing a second panel.

FIG. 1 illustrates moveable crossbar 20 in a folded down vertical position lying adjacent to the lower half of vertical crossbar 16. In FIG. 2, moveable crossbar 20 is being pivoted upwards to be horizontal. In FIG. 3, moveable crossbar 20 is in the horizontal position and is adjacent to left side 12D of frame 12, which is the operating position for supporting a panel 14. Moveable crossbar 20 generally is attached to the middle of vertical crossbar 16 so that the point of attachment is on the same linear plane with horizontal crossbar 18 and so that the point of attachment is in the center of frame 12. The width of moveable crossbar 20 also can be thicker or thinner than the width of the walls of frame 12. Moveable crossbar 20 also can have has a flat, rectangular cross-section and function more of a brace. However, as moveable crossbar 20 generally supports one or more panels 14, moveable crossbar 20 also can have a shaped cross-section and be used, for example, as a guide for rollers attached to the panels 14. More specifically, moveable crossbar 20 have a formed cross-section allowing a guiding portion of panels 14, such as roller or pads, to fit within the cross-section of crossbars 16, 18, as shown illustratively in FIG. 10.

Referring now to FIGS. 2–7, the operation of the sliding panel system is shown in greater detail. With the panels 14 in a stored position, at least a portion of the internal area of the frame 12 is open. For example, when the panels 14 in a four-panel configuration are in the stored position in a corner of the frame 12, three-quarters of the area of the frame 12 is open. When the invention 10 is used to enclose a vehicle 50 as shown in FIG. 11, this opening allows a passenger or driver to enter and exit the vehicle 50. When the invention 10 is used to enclose a structure 60 as shown in FIG. 12, this allows one to enter and exit the structure 60 and to allow continuous air circulation into and out of the structure 60. When the invention is used as a display device 70 as shown in FIG. 13, this allows storage of the panels 14 or of additional panels 14 or other items behind the open area of the frame 12.

FIG. 1 illustrates an embodiment of the invention in the open position. To close the panel system, the moveable crossbar 20 is pivoted upwards or downwards, as appropriate, to be horizontal and extend between the vertical crossbar 16 and the second side 12D of the frame 12. A single panel 14A, previously stored in a corner of the frame 12, can be slid from the stored position and underneath the moveable crossbar 20. This closes the bottom half of the frame 12 while leaving the top half open. Another single panel 14B can be slid upwards from the stored position and locked into place. This closes three-quarters of the frame 12 while leaving one top quadrant open. This same panel 14B can be slid across and over the moveable crossbar 20. In this position, one top quadrant of the frame 12 is left open and the remaining three quadrants are closed. Another single panel 14C from the stored position can be slid upwards and locked into place, thus closing the entire frame 12. The remaining panel 14D in the stored position remains there, and can be permanently mounted so that it is not slidable, or it can be made slidable so that more configurations can be created.

FIG. 2 illustrates the initial moving of moveable crossbar 20 towards the horizontal position. Panels 14 are capable of displacement between an open position where the panels 14 are contained in one corner of frame 12, and a closed position where the panels 14 are moved aside with respect to the open position. Variations of closed and open positions can be formed depending on where the panels 14 are contained within frame 12.

FIG. 3 illustrates the process of sliding panel 14A to the side, underneath moveable crossbar 20, where it will come into contact with the second side 12D of frame 12. Now moveable crossbar 20 also can be laterally supported by the upper horizontal edge of panel 14A, as well as, or alternatively, being locked into place by latches, pins, bolts or the like, or both. In this position, the top half of the panel system frame 12 is open and the bottom half is closed. Specifically, in this position, the top left quadrant of frame 12 is open and the remaining three quadrants are closed. The panels 14 pass from one to the other of these various positions by lateral and longitudinal displacement in a direction from the closed plane to the opening plane and sliding in the opening plane.

Figure 4:
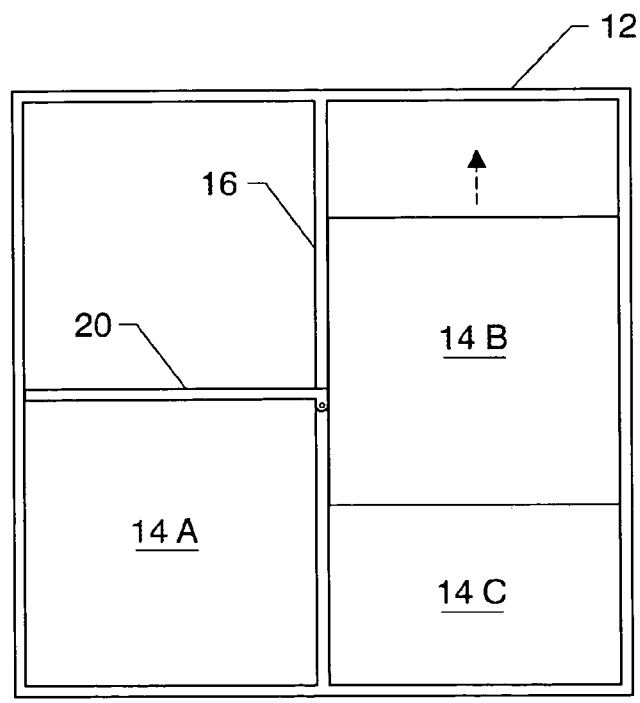
FIG. 4 is a front view of the embodiment of the sliding panel system of FIG. 1 with the first panel slid to the side and underneath the movable crossbar, and a second panel slid upwards, exposing a third panel.

FIG. 4 illustrates the process of sliding panel 14B, which was behind panel 14A in this illustrative embodiment, upwards between vertical crossbar 16 and the first side 12C of frame 12. Panel 14B can be left in this position, that is, in the upper right of frame 12, by locking panel 14B within frame 12 by the means disclosed below. In this position, the top half of the panel system frame 12 is half closed and the bottom half is closed. Horizontal crossbar 18 does not necessarily laterally support panel 14B, as panel 14B can be slid in front of or behind flat horizontal crossbar 18. Alternatively, horizontal crossbar 18 can have a structure allowing it to support the bottom edge of panel 14B when panel 14B is in the upper position.

Figure 5:
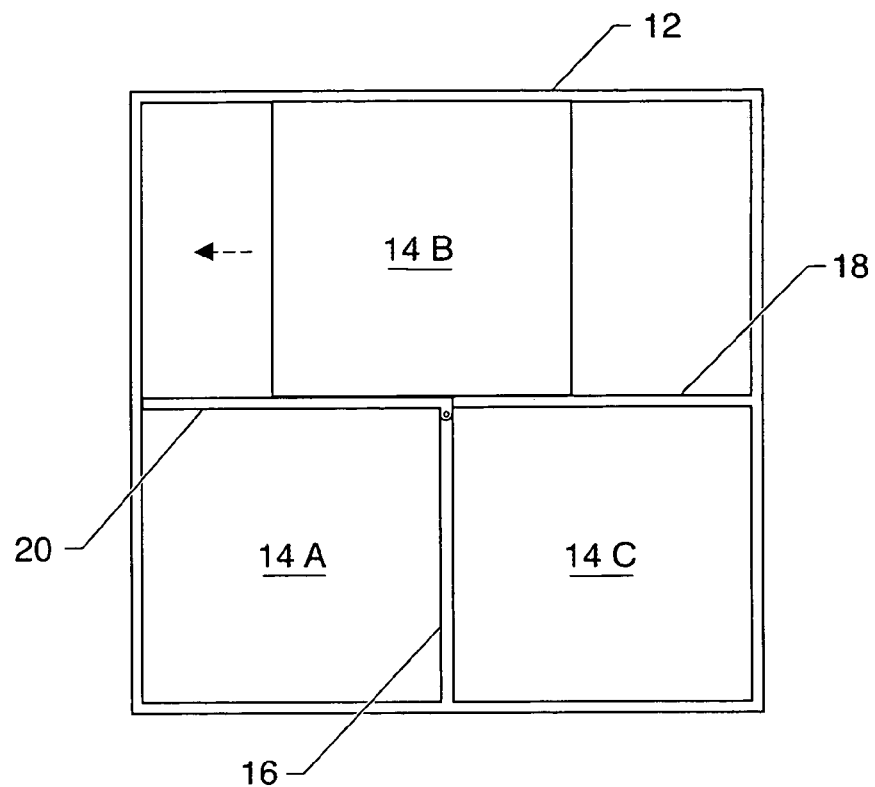
FIG. 5 is a front view of the embodiment of the sliding panel system of FIG. 1 with the first panel slid to the side and underneath the movable crossbar, and the second panel slid across and above the movable crossbar.

FIG. 5 illustrates the process of sliding panel 14B laterally over movable crossbar 20, where it will come into contact with the second side 12D of frame 12. Now moveable crossbar 20 also can support panel 14B. In this position, the top half of the panel system frame 12 is half closed and the bottom half is closed. Specifically, in this position, the top right quadrant of frame 12 is open and the remaining three quadrants are closed.

Figure 6:
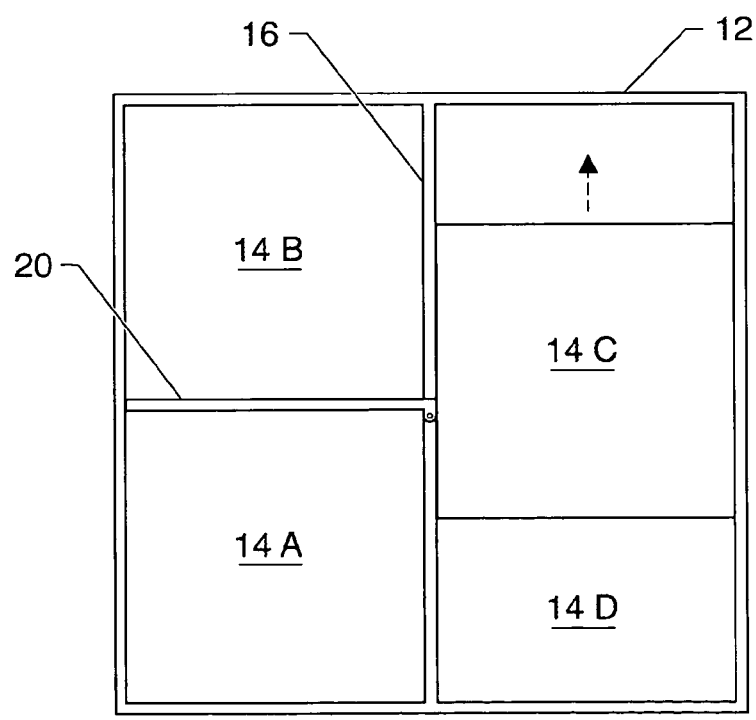
FIG. 6 is a front view of the embodiment of the sliding panel system of FIG. 1 with the first panel slid to the side and underneath the movable crossbar, the second panel slid up and then across and over the movable crossbar, and the third panel slid upwards, exposing a fourth panel.

FIG. 6 illustrates the process of sliding panel 14C, which was behind panel 14A in this illustrative embodiment, upwards between vertical crossbar 16 and the first side 12C of frame 12. Panel 14C now can be left in this position, that is, in the upper right of frame 12, by locking panel 14C within frame 12 by the means already disclosed.

Figure 7:
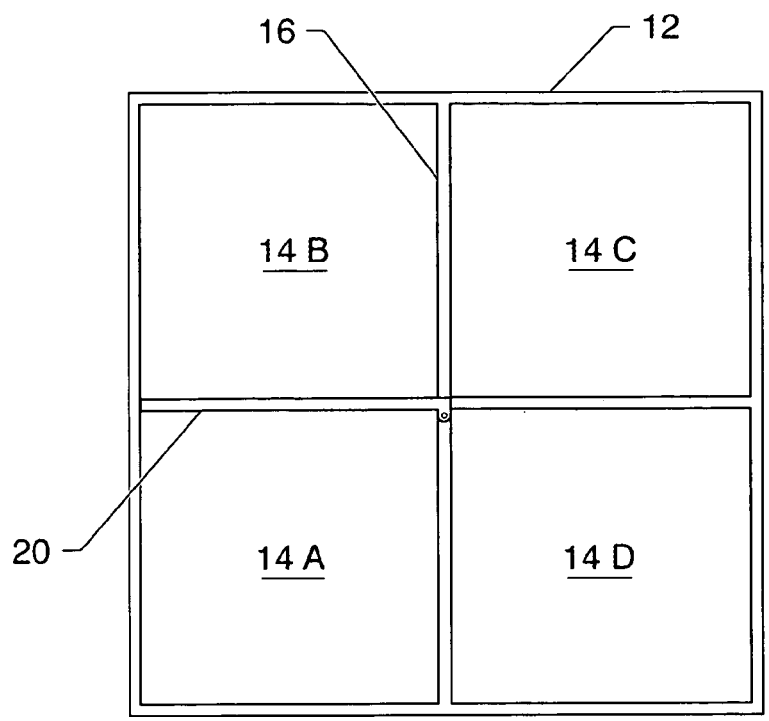
FIG. 7 is a front view of the embodiment of the sliding panel system of FIG. 1 with the first panel slid to the side and underneath the movable crossbar, the second panel slid up and then across and over the movable crossbar, and the third panel slid upwards to the top of the vertical bar.

FIG. 7 illustrates the top half of the panel system frame 12 closed and the bottom half closed, after panel 14C has been slid. Panel 14D can be permanently mounted so that it is not slidable, or panel 14D can be made slidable so that more configurations can be created.

FIGS. 8A–8C illustrate that the length of moveable crossbar 20 can be extendable or telescoping or foldable so that moveable crossbar 20 can make contact with second side 12D of frame 12. For example, in one embodiment, the panel system is a chalkboard where frame 12 is 2 feet long (0.6 meters) and 4 feet tall (1.2 meters). In this example, moveable crossbar 20 is attached to vertical crossbar 16 at a point 1 foot (0.3 meters) from the top of frame 12, 1 foot (0.3 meters) from the bottom of frame 12, 2 feet (0.6 meters) from the left side of frame 12, and 2 feet (0.6 meters) from the right side of frame 12 (that is, in the center of the frame 12). Moveable crossbar 20 in this example would need to be 1 foot (0.3 meters) in length (equal to the length of the lower half of vertical crossbar 16) such that moveable crossbar 20 could be folded downwards or upwards and still remain within the boundaries of the frame 12. However, at this length, when moveable crossbar 20 is pivoted to the horizontal position, it would only extend halfway to second side 12D of frame 12 and could not be locked in place. With an extendable moveable crossbar 20, this problem is solved. For example, when moveable crossbar 20 is pivoted to be horizontal, it can be extended an additional 1 foot (0.3 meters) to be 2 feet (0.6 meters) long in total so that it can make contact with frame 12. In this position, moveable crossbar 20 is contiguous and pivotally connected to horizontal crossbar 18 so that the two crossbars 18, 20 are on the same linear plane. In this position, moveable crossbar 20 and horizontal crossbar 18 are centered between the top of frame 12 and the bottom of frame 12 so that one or more panels 14 can be placed on each side of the two crossbars 18, 20.

FIG. 9 illustrates that panels 14 can sit in direct contact with the frame 12 and its adjacent crossbar 16, 18, 20, and be separated form each other by a separating wall 26.

FIG. 10 illustrates an alternative embodiment in which panels 14 can be placed on a guidance device 24, such as wheels, rollers or pads, so that they slide along the inner walls of the frame 12 and the crossbars 16, 18, 20. A guidance device 24 can be placed on one, two, three, or all four sides of each panel 14. Conversely, a guidance device 24 can be placed along the inner walls the frame 12 and/or along the sides of the crossbars 16, 18, 20. Such guidance devices 24 and structures are known in the art, and can be similar to the common sliding glass shower door rail structure, the sliding glass patio door rail structure, and/or the folding closet door hanging structure. Some illustrative guidance devices 24 also include lower friction slides, such as nylon glides. Such guidance devices 24 dispose each panel 14 in such a way that the panel 14 is located slightly raised or removed from frame 12 or crossbars 16, 18, 20, so that panel 14 is no longer in direct contact with frame 12 or its adjacent crossbar 16, 18, 20. Panels 14 can be slid manually or be displaced by means of an electric motor (not shown).

Further, weather stripping, insulation and/or other sealants can be placed along the inner edges of frame 12 and/or along the sides of crossbars 16, 18, 20. For use as a door to help enclose a vehicle or structure, thin strips of rubber, plastic or felt lining the frame 12 and crossbars 16, 18, 20 can exclude rain, snow and/or cold air. Sealants to prevent outside air, which may be contaminated or otherwise undesirable, from entering any vehicle or structure on which the invention is mounted also may be placed along the inner edges of frame 12 and/or along the sides of crossbars 16, 18, 20.

FIG. 11 illustrates an example embodiment of the unit 10 as part of an enclosure 52 for a motor scooter vehicle 50. As can be seen, the unit 10 comprises the entry and exit means for the vehicle 50, as well as panels 14 constituting solid and or clear walls and windows. As previously disclosed, the panels 14 can be simple materials like wood, plastic or metal, or can be insulated for colder climates or bullet-proof for law enforcement and military uses.

FIG. 12 illustrates an example embodiment of the unit as part of a porch 62 of a residence 64. As can be seen, the unit 10 comprises the entry and exit means for the porch 62, as well as, for example, screen windows. As above, the panels 14 can be simple materials like wood, plastic, metal, glass or screens, or can be insulated for colder climates or bullet-proof for higher security uses.

FIG. 13 illustrates an example embodiment of the unit as a display device 70, such as a chalkboard or whiteboard. The system of panels 14 allows more text and information to be displayed using less wall space. Further, text or graphics can be hid from view or displayed by easily sliding panels 14 in different directions. Writings do not have to be erased; they can be simply moved to another section of the frame 12 and recalled for later reference.

FIG. 14 illustrates additional embodiments of the present invention that include the use of two or more horizontal crossbars 18 and/or vertical crossbars 16, along with additional panels 14, to create larger and/or more variable configurations. Also, as shown previously in FIGS. 8A–8C, the moveable crossbar 20 can be constructed of two or more sections 20A, 20B such that the length of moveable crossbar 20 can be variable, such as by telescoping as shown in FIG. 8A, folding as shown in FIGS. 8B and 8C, or the like, such that the length of the moveable crossbar 20 can be extended so that it can make contact with the frame 12 when in the horizontal position.

FIGS. 15A–15C illustrate example locking devices, such as latches 80, pins 82, hooks 84, bolts or the like, that can be attached to panels 14 to hold panels 14 into place if need be. Locking devices can also be placed on the inner edges of frame 12 and/or on the sides of crossbars 16, 18, 20. Such locking devices are known and can be similar to those currently use on sliding windows and screens in residences. Otherwise, the panels 14 can be held in place by friction or the surrounding structures.

In addition to closure by lateral and longitudinal displacement of panels 14, various configurations can also be made by using different materials as panels 14. For example, in one embodiment, panels 14A and 14D can be aluminum, and panels 14B and 14C can be glass or wire screen. In this embodiment, the bottom half of the closed panel system is solid and opaque and the top half of the closed panel system is translucent or permeable. For use on a vehicle, it is preferable that at least panel 14B is a window. Panels 14A and 14C also can be windows, as well as panel 14D. In another example, in another embodiment, a whiteboard of equal length and width is placed behind frame 12, so that three-quarters of the open panel system is whiteboard. In this embodiment, two panels 14 are whiteboard and two panels 14 are corkboard so that multiple whiteboard/corkboard configurations can be realized, thereby creating an effective personal wall organizer. In other embodiments, transparent, translucent or permeable wire screen or glass panels 14 can be used in place of solid and opaque panels 14. Additionally, in several other illustrative embodiments, the panels 14 can be insulative or non-insulative, shatterproof or break and crack resistant, or bulletproof.

The present invention allows multiple panels 14 to slide along both the horizontal and vertical axes of a frame 12. Such a multi-directional displacement can create openings of different sizes, shapes and locations within the frame 12. In addition to its advantages over the prior art, the present invention also retains certain important features. The panels 14 can take up little space but can be rigid enough when closed to withstand high winds and other weather elements. The panels 14 are conveniently contained within the frame 12 structure so there are no loose pieces to be lost or destroyed. Further, the panels 14 do not have to swing out to open, saving space and making them easy to deal with. Because the panels 14 do not swing out to open, they are not subject to the wind if used to enclose a structure 60, and can be left open to drive a vehicle 50.

The above detailed description of the preferred embodiments and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. A system of sliding panels installed on a vehicle and contained in a frame, the system comprising at least one movable crossbar that pivots within the frame about an axis and at least one panel, wherein at least one of the panels is movable in at least two directions along the frame so that placement of the at least one panel in select positions within the frame creates openings of different sizes, shapes and locations within the frame.

2. The system as claimed in claim 1, further comprising at least one vertical crossbar, wherein the at least one movable crossbar is pivotably attached to the at least one vertical crossbar; and the at least one panel is movable in a horizontal and vertical direction.

3. The system as claimed in claim 1, wherein the at least one movable crossbar is lockable in place within the frame.

4. The system as claimed in claim 1, wherein the at least one panel can be slid along the at least one movable crossbar.

5. The system as claimed in claim 1, wherein the at least one movable crossbar is pivotable by approximately 90 degrees.

6. The system as claimed in claim 5, wherein the movement of the at least one panel is along the at least one movable crossbar.

7. The system as claimed in claim 1, wherein the movement of the at least one panel in one direction creates an opening in the system.

8. The system as claimed in claim 1, wherein an electric means is used to move the at least one panel.

9. The system as claimed in claim 1, wherein a first of the least one panel can be slid behind or in front of a second of the at least one panel.

10. The system as claimed in claim 4, wherein the at least one movable crossbar is lockable in place within the frame.

11. The system as claimed in claim 1, wherein all of the at least one panels can be placed in one corner of the frame.

12. The system as claimed in claim 1, wherein the movable bar pivots to a position against a part of the frame so as to create a larger continuous opening through the frame greater than the size of any one of the at least one panel.

13. A system of sliding panels installed on a vehicle and contained in a frame, the system comprising at least one movable crossbar that pivots about an axis and at least one panel; wherein at least one of the panels is displaceable to switch the system between a closed position and an open position, and wherein the at least one of the panel can be slid upwards, downwards or sideways to switch the system between the closed position and the opened position.

14. The system as claimed in claim 13, wherein the frame is rectangular.

15. The system as claimed in claim 13, comprising four sliding panels.

16. The system as claimed in claim 13, wherein at least one of the panels is transparent.

17. The system as claimed in claim 14, wherein in the closed position at least two of the panels are located physically above two other panels.

18. The system as claimed in claim 17, wherein the movable crossbar pivots to a position against the frame creates an opening larger than any one panel previously flanking the movable crossbar.

19. The system as claimed in claim 14, wherein the at least one movable crossbar holds at least one panel in place above another panel.

20. The system as claimed in claim 15, wherein two panels can be slid behind at least one other panel.

21. The system as claimed in claim 15, wherein three panels can be slid behind a fourth panel.

22. A system of four sliding panels installed on a vehicle, the system comprising;
   a. a rectangular frame having a top side, a bottom side a first side and a second side;
   b. a vertical crossbar extending from the top side of the frame to the bottom side of the frame;
   c. a movable crossbar pivotably attached to the vertical crossbar and that pivots about an axis;
   d. a horizontal crossbar extending from the first side of the frame to the vertical crossbar; and
   e. a plurality of sliding panels, wherein the movable crossbar is pivotally attached proximal to the center of the vertical crossbar; the sliding panels are storable in a corner of the frame and are movable to different positions within the frame; the system has an open position, a closed position and a partially open position; the vertical crossbar can separate at least two panels from each other; and three of the panels can be slid behind at least one other panel in the open position.

23. The system as claimed in claim 22, wherein the at least one panel can be slid along the movable crossbar.

24. The system as claimed in claim 22, wherein at least two of the panels are slid in one direction and the movable crossbar is pivoted downward so to create an opening through the frame for a person to enter or exit the vehicle.

25. The system as claimed in claim 22, wherein the movable crossbar is constructed of two or more sections; and the length of the movable crossbar is variable.

* * * * *